United States Patent
Studzinski

(10) Patent No.: US 9,116,919 B2
(45) Date of Patent: Aug. 25, 2015

(54) METHOD AND APPARATUS FOR EVALUATING AN ATTRIBUTE OF A POINT OF INTEREST

(71) Applicant: TOMTOM POLSKA SP . Z O.O., Warsaw (PL)

(72) Inventor: Witold Studzinski, Lodz (PL)

( * ) Notice: Subject to any disclaimer, the term of this patent is extended or adjusted under 35 U.S.C. 154(b) by 0 days.

(21) Appl. No.: 14/181,748

(22) Filed: Feb. 17, 2014

(65) Prior Publication Data
US 2014/0163869 A1    Jun. 12, 2014

Related U.S. Application Data

(63) Continuation of application No. 13/517,742, filed on Jun. 14, 2012, now Pat. No. 8,700,321, which is a continuation of application No. PCT/EP2010/051495, filed on Feb. 8, 2010.

(60) Provisional application No. 61/286,036, filed on Dec. 14, 2009.

(51) Int. Cl.
*G01C 21/32* (2006.01)
*G06F 17/30* (2006.01)

(52) U.S. Cl.
CPC .......... *G06F 17/30241* (2013.01); *G01C 21/32* (2013.01); *G06F 17/30333* (2013.01)

(58) Field of Classification Search
CPC .. G01C 21/32; G01C 21/3679; G01C 21/343; G01C 21/3484; G01C 21/2682; G08G 1/096816; G08G 1/096844; G08G 1/096866; G06F 17/3087
USPC .......................... 701/450, 533, 540, 431, 426; 340/995.24, 457.4
See application file for complete search history.

(56) References Cited

U.S. PATENT DOCUMENTS

| | | |
|---|---|---|
| 8,751,427 B1 | 6/2014 | Mysen et al. |
| 2005/0278114 A1* | 12/2005 | Ahmad .......................... 701/431 |
| 2006/0149459 A1* | 7/2006 | Matsuura et al. ............. 701/540 |
| 2008/0200153 A1 | 8/2008 | Fitzpatrick et al. |
| 2008/0306826 A1 | 12/2008 | Kramer et al. |
| 2009/0240429 A1* | 9/2009 | Tanaka et al. ................. 701/533 |
| 2011/0276565 A1 | 11/2011 | Zheng et al. |

FOREIGN PATENT DOCUMENTS

JP    2004287807 A    10/2004

* cited by examiner

*Primary Examiner* — Marthe Marc-Coleman

(57) ABSTRACT

A method of evaluating an attribute of a point of interest 150 comprises associating a region 152 with the point of interest 150; and evaluating 148 the attribute according to a comparison of position data 154,156,158 of a plurality of users with position data defining the associated region.

20 Claims, 8 Drawing Sheets

METHOD AND APPARATUS FOR EVALUATING AN ATTRIBUTE OF A POINT OF INTEREST

CROSS-REFERENCES TO RELATED APPLICATIONS

The present application is a Continuation of U.S. patent application Ser. No. 13/517,742 filed on Jun. 14, 2012, which is a Continuation of International Application No. PCT/EP2010/051495 filed Feb. 8, 2010, and designating the United States, which claims benefit to U.S. Provisional Patent Application Ser. No. 61/286,036 filed on Dec. 14, 2009. The entire contents of these applications are incorporated herein by reference.

FIELD OF THE INVENTION

The present invention relates to a method of evaluating an attribute for a point of interest and, in particular, though not exclusively, a method of evaluating an attribute for a point of interest from position data of a user of a navigation system such as a satellite navigation system.

BACKGROUND OF THE INVENTION

Portable computing devices, for example Portable Navigation Devices (PNDs) that include GPS (Global Positioning System) signal reception and processing functionality are well known and are widely employed as in-car or other vehicle navigation systems.

In general terms, a modern PND comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Bluetooth, Wi-Fi, Wi-Max, GSM, UMTS and the like.

PNDs also usually include a GPS antenna by means of which satellite-broadcast signals, including position data, can be received and subsequently processed to determine a current position of the device.

PNDs are able to determine a route between a first location (for example a start or current location) and a second location (for example a destination). These locations can be input by a user of the device, by any of a wide variety of different methods, for example by postcode, street name and house number. Alternatively, locations may be previously stored locations, such as, shops, restaurants, theatres, travel termini, schools, tourist attractions, viewpoints, sports grounds or swimming baths. Such locations can be referred to as points of interest (POIs), and data concerning such points of interest including their location and other attributes are included in stored map data.

Digital map data is used for a variety of applications, and by a variety of devices, not only PNDs. For example, a wide range of computer applications or internet sites use map data in the display of location maps or in searching or other processes.

The inclusion of data representing the location of points of interest can be useful for a wide range of applications, and can increase the value of the map data. However, in any given area there can be a large number of possible points of interest of different types, and of variable importance, quality or interest.

In known systems for generating and maintaining map data, further attributes of points of interest in addition to their location can be stored. Such attributes for a point of interest can be established by a variety of well known techniques including manually inspecting or evaluating the point of interest, conducting aerial surveys of the point of interest, monitoring the point of interest, making enquiries to staff at the point of interest, obtaining data from a website associated with the point of interest and polling the opinion of visitors to the point of interest. Examples of such attributes may be the popularity of the point of interest or visitor satisfaction, or opening and/or closing times or busy and/or quiet times.

However, establishing the popularity of, or polling visitor opinion for, or determining other attributes of a point of interest using such techniques is often time-consuming and expensive especially as the number of visitors to the point of interest increases. Monitoring such attributes repeatedly over a time period may also compound the time and costs involved, and monitoring such attributes for more than one point of interest can increase the difficulties.

SUMMARY OF THE INVENTION

According to a first aspect of the present invention there is provided a method of evaluating an attribute of a point of interest comprising:

associating a region with the point of interest; and evaluating the attribute according to a comparison of position data of a plurality of users with position data defining the associated region.

Large quantities of user position data can be obtained from existing navigation systems, mobile phone systems or other systems that can determine the positions of user devices. By evaluating an attribute of a point of interest using, for example, such position data, an efficient automated procedure for determining an attribute of a point of interest may be provided.

A point of interest may be a location that may be visited by a user, and may for example be a location where a user may obtain or consume goods and/or services. Examples of points of interest comprise, for example, one or more of shops, restaurants, theatres, travel termini, schools, tourist attractions, viewpoints, sports grounds or swimming baths.

An attribute of a POI may be a property of or associated with a POI that may be determined from user position data over time. POIs may also be categorised in different categories according to the nature of the goods and/or services provided at the POI.

The users may be users for whom position data has been measured and/or stored in a database.

The associated region may have any shape or size.

The associated region may comprise an area or zone surrounding the point of interest. For example, the associated region may comprise a substantially circular area centred on the point of interest.

The associated region may comprise an area or zone adjacent to the point of interest.

The associated region may comprise at least a portion of a feature associated with or adjacent to the point of interest such as a car park, road, approach road, driveway or the like.

The associated region may be defined by a boundary of land, grounds and/or property or the like associated with the point of interest.

The associated region may be defined by a boundary feature associated with the point of interest such as a fence, wall or the like.

The associated region may vary with time.

The associated region may be dependent on the nature of the goods and/or services offered at the point of interest. For example, the shape and/or size of the associated region may be dependent on the nature of the goods and/or services offered at the point of interest.

The shape and/or size of the associated region may be dependent on the shape and/or size of a region associated with other points of interest. For example, the shape and/or size of the associated region may be dependent on the shape and/or size of a region associated with a neighbouring or an adjacent point of interest. The shape and/or size of the associated region may be dependent on the proximity of a neighbouring or an adjacent point of interest.

The position data defining the associated region may comprise data representative of a plurality of positions, for example a plurality of positions associated with the point of interest or the location of the point of interest.

The position data defining the associated region may comprise or be generated according to a function or an algorithm.

The position data defining the associated region may be representative of or associated with a boundary or boundary feature of the associated region.

The method may comprise evaluating the attribute according to the variation of the position data of a user over time for each user in the plurality of users. The method may comprise determining the number of users entering the associated region.

The method may comprise identifying a user as visiting the point of interest if the user enters the associated region.

The method may comprise determining the proportion of the number of users entering the associated region. For example, the method may comprise determining the ratio of the number of users entering the associated region to the total number of users.

The total number of users for whom position data is measured and/or stored in a database may change over time, for example as a result of a change in the total number of owners of portable navigation devices or the like. The number of users entering the associated region may, however, be a function of the total number of users for whom position data is measured and/or stored in the database. Accordingly, the proportion of the total number of users who enter the associated region may be a more meaningful measure of the popularity of the point of interest than the number of users entering the associated region.

Such a method allows visitor statistics for a point of interest to be collected automatically from user position data measured using a navigation system without the need to collect visitor statistics by other means such as, by manually inspecting or monitoring the point of interest, by conducting aerial surveys of the point of interest, and/or by polling visitor opinion or the like.

The method may comprise determining a speed of a user within the associated region.

The method may comprise comparing the speed of a user within the associated region to a threshold speed and only identifying the user as visiting the point of interest if the speed of the user in the associated region is less than the threshold speed.

The method may comprise determining the length of time a user spends within the associated region. For example, the method may comprise determining the length of time a user spends within the associated region according to the number of successive times in which the user is located within the associated region and the time intervals between the successive times.

The method may comprise comparing the length of time a user spends within the associated region to a threshold time period and only identifying the user as visiting the point of interest if the length of time a user spends within the associated region is greater than the threshold time period.

The evaluation of the attribute may comprise evaluating the attribute in accordance with at least one of the determined number of users in the associated region, the determined speed of a user in the associated region and the length of time spent by a user within the associated region.

The method may comprise determining the number of users within the associated region at a time.

The method may comprise determining the respective number of users within the associated region at different times over the course of a day, a week, a month, a year or a plurality of years.

The method may comprise determining the number of users visiting the point of interest in a time period.

The method may comprise determining the number of users visiting the point of interest in a time period of a second, a minute, an hour, a day, a week, a month, a season, a year or a plurality of years.

Determining the evolution of visitor statistics over time allows the analysis of visitor behaviour, the identification of visitor trends or the response of a visitor population to a change made to the point of interest or to other associated points of interest.

The method may comprise determining an opening time and/or a closing time for a point of interest according to the number of users within the associated region at each of a plurality of different times.

For example, the method may comprise identifying an opening time as a time between a first time when the number of users within the associated region is less than a predetermined threshold number and a second later time when the number of users within the associated region is greater than the predetermined threshold proportion.

Similarly, the method may comprise identifying a closing time as a time between a first time when the number of users within the associated region is greater than a predetermined threshold number and a second later time when the number of users within the associated region is less than the predetermined number.

The method may comprise determining an opening time and/or a closing time for a point of interest according to the respective number of users visiting the point of interest within each of a plurality of different time periods.

For example, the method may comprise identifying an opening time as a time between a first time period in which the number of users visiting the point of interest is less than a predetermined threshold number and a second later time period in which the number of users visiting the point of interest is greater than the predetermined threshold number.

Similarly, the method may comprise identifying a closing time as a time between a first time period in which the number of users visiting the point of interest is greater than a predetermined number and a second later time period in which the number of users visiting the point of interest is less than the predetermined number.

The method may comprise determining an open time period and/or a closed time period for a point of interest according to the respective number of users visiting the point of interest within each of a plurality of different time periods.

The method may comprise determining whether a point of interest is open or closed to visitors on a day according to number of users visiting the point of interest on the day.

For example, the method may comprise identifying an open day for the point of interest as a day in which the number of users visiting the point of interest is greater than a predetermined number.

Similarly, the method may comprise identifying a closed day for the point of interest as a day in which the number of users visiting the point of interest is less than a predetermined number.

The method may comprise determining whether a point of interest is open or closed to visitors on a particular day of the week according to a number of users visiting the point of interest on each of a plurality of such week days.

The method may comprise determining a busy time and/or a quiet time for a point of interest according to the number of users within the associated region at each of a plurality of different times.

For example, the method may comprise identifying a busy time as a time when a maximum number of users are within the associated region.

Similarly, the method may comprise identifying a quiet time as a time when a minimum number of users are within the associated region.

The method may comprise determining a busy time period and/or a quiet time period for a point of interest according to the respective number of users visiting the point of interest within each of a plurality of different time periods.

For example, the method may comprise identifying a busy time period as a time period when the maximum number of users visit the point of interest.

Similarly, the method may comprise identifying a quiet time period as a time period when the minimum number of users visit the point of interest.

The method may comprise assigning one or more categories to the point of interest according to the nature of the goods and/or services offered at the point of interest. For example, the method may comprise assigning one or more categories to the point of interest from a list of categories including but not limited to retail, commercial, industrial, residential, roadside, hospitality, entertainment, leisure, public, visitor attraction and the like.

The method may, for example, comprise assigning a retail category to a point of interest when the point of interest comprises a retail outlet, supermarket, shopping mall, retail park, shop, store or the like.

The method may, for example, comprise assigning a commercial category to a point of interest when the point of interest comprises a bank, commercial entity, office, or the like.

The method may, for example, comprise assigning a roadside category to a point of interest when the point of interest comprises a facility offering roadside services such as a gas station, petrol station, roadside café, roadside restaurant, roadside shop, motel or the like.

The method may, for example, comprise assigning a hospitality category to a point of interest when the point of interest comprises a restaurant, café, bar, public house, hotel, or the like.

The method may, for example, comprise assigning an industrial category to a point of interest when the point of interest comprises an industrial estate, industrial premises, manufacturing plant, factory, warehouse or the like.

The method may, for example, comprise assigning a residential category to a point of interest when the point of interest comprises a residential address, dwelling, house or the like.

The method may, for example, comprise assigning an entertainment category to a point of interest when the point of interest comprises a cinema, theatre, concert venue or the like.

The method may, for example, comprise assigning a leisure category to a point of interest when the point of interest comprises a leisure centre, sports club, sports ground, swimming pool, park or the like.

The method may, for example, comprise assigning a point of interest to a public services category when the point of interest comprises a police station, hospital, school, university, college, court, civil service facility, local services facility or the like.

The method may, for example, comprise assigning a visitor attraction category to a point of interest when the point of interest comprises an exhibition centre, an art gallery, a museum, a tourist attraction, a landmark, a place of historic significance or a place of natural beauty or the like.

The method may comprise evaluating a quality parameter of the point of interest according to the number of users visiting the point of interest.

The method may comprise evaluating a quality parameter of the point of interest according to the speed of a user within the associated region for each user in the plurality of users. For example, the method may comprise evaluating a quality parameter of the point of interest according to an average speed of a user in the associated region.

The method may comprise evaluating a quality parameter of the point of interest according to the length of time a user spends within the associated region for each user in the plurality of users. For example, the method may comprise evaluating a quality parameter of the point of interest according to an average length of time a user spends within the associated region.

The quality parameter may represent the popularity of or quantify the interest of the plurality of users in the point of interest.

The method may comprise evaluating a quality parameter for the point of interest according to at least one of the number of users entering the associated region, the speed in the associated region of each user entering the associated region and the length of time spent in the associated region by each user entering the associated region.

The method may comprise evaluating a quality parameter for the point of interest for a time period according to at least one of the number of users entering the associated region during the time period, the speed in the associated region of each user entering the associated region during the time period and the length of time spent in the associated region by each user entering the associated region during the time period.

The method may comprise evaluating a quality parameter for the point of interest according to at least one of the number of users entering the associated region, the average speed of users in the associated region and the average length of time a user spends in the associated region.

The method may comprise evaluating the quality parameter for different times.

The method may comprise evaluating the quality parameter for different time periods.

The method may comprise determining an opening time and/or a closing time for a point of interest according to a quality parameter value for the point of interest at each of a plurality of different times.

For example, the method may comprise identifying an opening time as a time between a first time when the quality parameter value is less than a predetermined value and a second later time when the quality parameter value is greater than the predetermined value.

Similarly, the method may comprise identifying a closing time as a time between a first time when the quality parameter value is greater than a predetermined value and a second later time when the quality parameter value is less than the predetermined value.

The method may comprise determining an opening time and/or a closing time for a point of interest according to the respective quality parameter values for the point of interest within each of a plurality of different time periods.

For example, the method may comprise identifying an opening time as a time between a first time period in which the quality parameter value is less than a predetermined value and a second later time period in which the quality parameter value is greater than the predetermined value.

Similarly, the method may comprise identifying a closing time as a time between a first time period in which the quality parameter value is greater than a predetermined value and a second later time period in which the quality parameter value is less than the predetermined value.

The method may comprise determining an open time period and/or a closed time period for a point of interest according to the quality parameter value within each of a plurality of different time periods.

The method may comprise determining whether a point of interest is open or closed to visitors on a day according to a quality parameter value on the day.

For example, the method may comprise identifying an open day for the point of interest as a day in which the quality parameter value evaluated for the day is greater than a predetermined number.

Similarly, the method may comprise identifying a closed day for the point of interest as a day in which the quality parameter value evaluated for the day is less than a predetermined number The method may comprise determining whether a point of interest is open or closed to visitors on a particular day of the week according to the quality parameter value evaluated on each of a plurality of such week days.

The method may comprise determining an opening time or an open time period and/or a closing time or a closed time period for the point of interest from quality parameter values for different times or different time periods.

The method may comprise determining a busy time period and/or a quiet time period for the point of interest from quality parameter values for different time periods.

For example, the method may comprise identifying a busy time period as a time period corresponding to a maximum quality parameter value.

Similarly, the method may comprise identifying a quiet time period as a time period corresponding to a minimum quality parameter value.

The method may comprise storing one or more attribute values and/or one or more categories for the point of interest in a database such as a digital mapping database or an electronic map or the like.

The method may comprise associating one or more attribute values and/or one or more categories for the point of interest stored in a database with position data for the point of interest in the database.

The method may comprise displaying one or more attribute values and/or one or more categories for the point of interest. For example, the method may comprise displaying a quality parameter value and/or one or more categories for the point of interest to allow a user to make a decision as to whether to visit a point of interest on the basis of quantitative information.

The method may comprising displaying one or more attribute values for the point of interest and/or one or more categories for the point of interest.

The method may comprising displaying one or more attribute values for the point of interest and/or one or more categories for the point of interest in response to a user request. The method may comprise associating a symbol with a category of a point of interest.

The method may comprise displaying a symbol associated with a category of a point of interest.

The method may comprise displaying an attribute value for the point of interest adjacent to a symbol representing the nature of the goods and/or services offered at the point of interest.

The method may comprise evaluating one or more attributes for each point of interest in a plurality of points of interest.

The method may comprise assigning one or more categories to each point of interest in a plurality of points of interest according to the nature of the goods and/or services offered at each of the points of interest.

The plurality of points of interest may comprise points of interest located within a predefined geographical area such as a town, urban area, suburb, district, postal area, city, region or the like.

The method may comprise storing one or more attribute values and/or one or more categories for each point of interest in a plurality of points of interest in a database such as a digital mapping database or an electronic map or the like.

The method may comprise associating one or more attribute values and/or one or more categories for each point of interest in a plurality of points of interest stored in a database with position data for each point of interest in the database.

The method may comprise displaying one or more attribute values and/or one or more categories for each point of interest in a plurality of points of interest.

The method may comprise associating a symbol with a category of each point of interest in a plurality of points of interest.

The method may comprise displaying a symbol associated with a category for each point of interest in a plurality of points of interest.

The method may comprise determining a rank for a point of interest in a plurality of points of interest according to quality parameter values for each point of interest in the same category within the plurality of points of interest.

The method may comprise determining a rank for the point of interest according to a quality parameter value for the point of interest and a quality parameter value for one or more further points of interest which offer the same or similar goods and/or services as the goods and/or services offered at the point of interest and which are located in the same geographical area as the point of interest.

The rank of a point of interest may be representative of the popularity of the point of interest relative to other points of interest in the same category. The rank of a point of interest may be representative of the popularity of the point of interest relative to other points of interest in the same category which are also within the same predefined geographical area such as a town, urban area, suburb, district, postal area, city, region or the like.

The method may comprise storing the rank for the point of interest in a plurality of points of interest in a database such as a digital mapping database or an electronic map or the like.

The method may comprise associating the rank for the point of interest stored in a database with position data for the point of interest in the database.

The method may comprise displaying the rank for the point of interest.

Displaying the rank for a point of interest may provide a user with information relating to the popularity of the point of interest relative to other points of interest in the same category. For example, displaying the rank for a point of interest may provide a user with information relating to the popularity of the point of interest relative to other points of interest in the same category which are also within the same predefined geographical area such as a town, urban area, suburb, district, postal area, city, region or the like. Displaying such a rank allows a user to make a decision as to whether to visit a point of interest on the basis of quantitative comparative information.

The method may comprise:
associating a region with a further point of interest; and
evaluating the attribute for the further point of interest according to a comparison of position data of the plurality of users with position data defining the region associated with the further point of interest.

The further point of interest may have the same category as the point of interest.

The further point of interest may have be in the same predefined geographical area such as a town, urban area, suburb, district, postal area, city, region or the like as the point of interest.

The method may comprise determining the number of users entering the region associated with the point of interest during a first time period who also enter the region associated with the further point of interest during a second time period.

The method may comprise associating the further point of interest with the point of interest according to the number of users entering the region associated with the point of interest during a first time period who also enter the region associated with the further point of interest during a second time period.

The method may comprise storing the number of users entering the region associated with the point of interest during a first time period who also enter the region associated with the further point of interest during a second time period in a database such as a digital mapping database or an electronic map or the like.

The method may comprise associating the number of users entering the region associated with the point of interest during a first time period who also enter the region associated with the further point of interest during a second time period with position data of the point of interest in a database.

The method may comprise displaying the number of users entering the region associated with the point of interest during a first time period who also enter the region associated with the further point of interest during a second time period.

Displaying the number of users entering the region associated with the point of interest during a first time period who also enter the region associated with the further point of interest during a second time period may allow a user to choose an alternative point of interest offering similar goods and/or services to the point of interest in the same predefined geographical area as the point of interest.

The method may comprise determining the position data of the user. For example, the method may comprise determining the position data of the user using absolute and/or relative position measurement techniques.

The method may comprise measuring user absolute position data using a satellite navigation system such as the Geographical Position System (GPS) or Galileo or the like.

The method may comprise measuring user relative position data using dead-reckoning or inertial navigation techniques.

The method may comprise measuring user relative position data using a gyroscope, an accelerometer or the like.

The method may comprise measuring user relative position data relative to mapped objects having a known absolute position or a known position relative to a common reference. For example, the method may comprise measuring user relative position data relative to mapped objects using one or more sensors such as a camera, laser scanner, or radar or the like.

The method may comprise determining the position data defining the associated region. For example, the method may comprise determining the position data defining the associated region using absolute and/or relative position measurement techniques.

The method may comprise measuring absolute position data defining the associated region using a satellite navigation system such as the Geographical Position System (GPS) or Galileo or the like.

The method may comprise measuring relative position data defining the associated region using dead-reckoning or inertial navigation techniques.

The method may comprise measuring relative position data defining the associated region using a gyroscope, an accelerometer or the like.

The method may comprise measuring relative position data defining the associated region relative to mapped objects having a known absolute position or a known position relative to a common reference. For example, the method may comprise measuring relative position data defining the associated region relative to mapped objects using one or more sensors such as a camera, laser scanner, or radar or the like.

The method may comprise storing position data defining the associated region in a database such as a digital mapping database or an electronic map or the like.

The method may comprise associating the position data defining the associated region in the database with position data of the point of interest in the database.

The method may comprise displaying the associated region.

According to a further aspect of the invention there is provided a navigation device configured to receive and display a value of an attribute for the point of interest determined using the method.

According to a further aspect of the invention there is provided an apparatus configured to implement the method.

According to a further independent aspect of the invention there is provided an apparatus for evaluating an attribute of a point of interest, comprising a data store for storing position data of a plurality of users, and a processing resource adapted to associate a region with the point of interest and to evaluate the attribute according to a comparison of position data of the plurality of users with position data defining the associated region.

The plurality of users may comprise a number of users for whom position data has been stored in the data store.

The apparatus may be configured to evaluate the attribute according to variation of the position data of a user over time for each user in the plurality of users.

The apparatus may be configured to determine the number of users entering the associated region.

The apparatus may be configured to determine a speed of a user within the associated region.

The apparatus may be configured to determine the length of time a user spends within the associated region.

The apparatus may be configured to evaluate a quality parameter for the point of interest according to at least one of the number of users entering the associated region, the speed in the associated region of each user entering the associated region and the length of time spent in the associated region for each user entering the associated region.

The apparatus may be configured to evaluate the quality parameter for different time periods.

The apparatus may be configured to determine an opening time or an open time period and/or a closing time or a closed time period for the point of interest from quality parameter values for different times or different time periods.

The apparatus may be configured to determine a busy time period and/or a quiet time period for the point of interest from quality parameter values for different time periods.

The apparatus may be configured to determine a rank for a point of interest according to a quality parameter value for the point of interest and a quality parameter value for one or more further points of interest which offer the same or similar goods and/or services as the goods and/or services offered at the point of interest and which are located in the same geographical area as the point of interest.

The apparatus may be configured to display an attribute value for the point of interest.

The apparatus may be configured to display the attribute value for the point of interest in response to a user request.

The apparatus may be configured to display the attribute value for the point of interest adjacent to a symbol representing the nature of the goods and/or services offered at the point of interest. According to another independent aspect of the invention there is provided a database comprising position data for a point of interest and an attribute value associated with the point of interest, wherein the attribute value is evaluated by associating a region with the point of interest and comparing position data of a plurality of users with position data defining the associated region. According to a further independent aspect of the present invention there is provided a navigation system comprising a device for evaluating an attribute of a point of interest according to a comparison of position data for each of a plurality of users with position data defining a region associated with the point of interest.

The navigation system may, for example, comprise a satellite navigation system such as the Geographical Position System (GPS) or Galileo or the like.

The navigation system may comprise a navigation device such as a portable navigation device (PND) or the like.

The navigation system may comprise a vehicle navigation system or the like. The navigation system may comprise hardware configured for dead-reckoning or inertial navigation. For example, the navigation system may comprise a gyroscope, an accelerometer or the like.

The navigation system may comprise hardware for measuring user relative position data relative to mapped objects. For example, the navigation system may comprise one or more sensors such as a camera, laser scanner, or radar or the like.

The navigation system may comprise a database such as a digital mapping database or an electronic map or the like.

Any feature in one aspect of the invention may be applied to any other aspect, in any appropriate combination. For example, any one of apparatus, system, method or computer program product features may be applied to any other one or more of apparatus, system, method or computer program product features.

BRIEF DESCRIPTION OF THE DRAWINGS

The present invention will be further described by way of non-limiting example only with reference to the following figures of which.

DETAILED DESCRIPTION OF THE DRAWINGS

Figure 1:
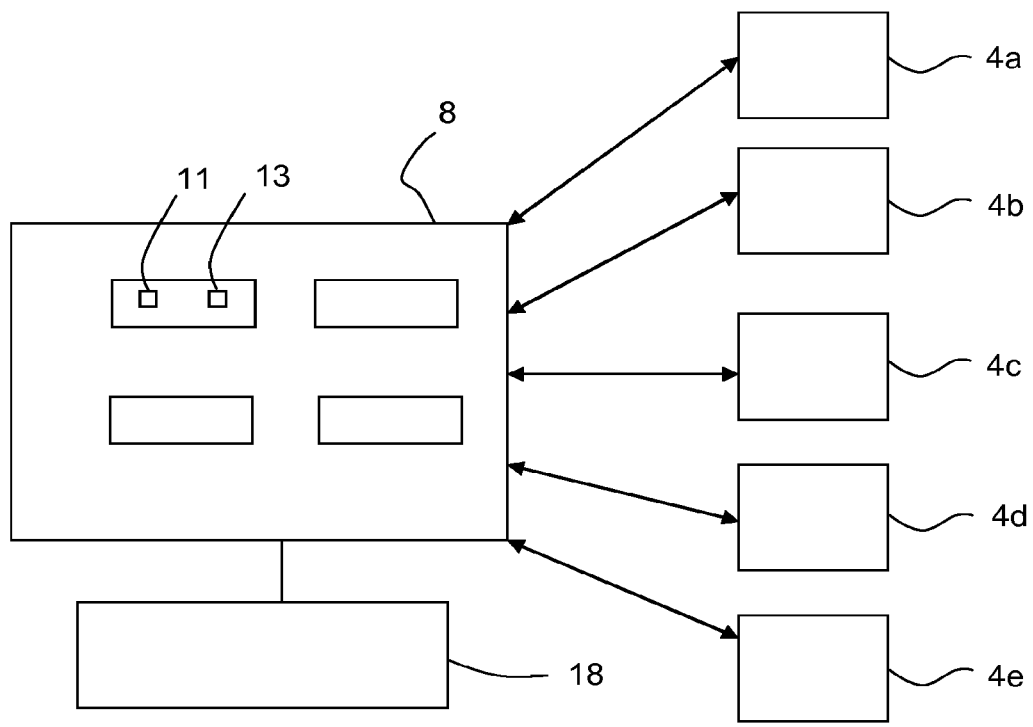
FIG. 1 is a schematic representation of a mapping and/or navigation system comprising an embodiment of the present invention.

FIG. 1 is a schematic illustration of a mapping and/or navigation system. The system comprises a server 8 that is operable to communicate with a plurality of location determining devices 4a to 4e, in this case portable navigation devices. Only five navigation devices 4a to 4e are shown for clarity, but it will be understood that in practice many thousands, or more, navigation devices may communicate with the server 8.

Although the devices 4a to 4e shown in FIG. 1 are portable navigation devices, they may be any type of device that is able to determine its own position and to provide position data to the server 8, for example any type of GPS-enabled device including mobile phones, PDAs or personal computers.

The server 8 comprises a processor 12, a memory 14, a transmitter 20 and a receiver 22. In operation the processor 12 is operable to execute processing software that includes a position data processing module 11 for processing user position data, for example user position data received from the devices 4a to 4e, and a point of interest (POI) data processing module 13.

The server 8 is linked to a data store 18 which stores map data, and also stores user position data.

In the normal course of operation of the navigation devices 4a to 4e, GPS data from the navigation devices is regularly recorded (for example, each 5 seconds for some known systems) on a logging device, usually in the form of a data logger module included in the portable navigation devices themselves. The GPS data for each navigation device is transmitted to the server 8 via an internet connection when the navigation device is docked by the user in a docking station for charging or updating. The user may be asked his or her permission to transmit the GPS data to the server, and it has been found that most users permit such transmission of the GPS data. In a variant of the described embodiment, the data is transmitted directly from the navigation devices 4a to 4e using a wireless connection. In each case, the GPS data is treated anonymously and cannot be tracked back to a particular user.

The server 8 stores all the GPS data collected over time together with latitude/longitude positioning information in the mass data storage 18. It will be understood that a huge quantity of GPS data from many users is built up, and over time GPS data representative of travel over every possible road in a region or network is obtained. As well as providing user position information, the GPS data can be analysed to provide speed or other trajectory data or operational data for each navigation device if required.

The mass data storage 18 also stores map data, that may for example include a digital graph of a road network describing the topology of the road network as a mathematical graph using nodes and connection structures (road segments).

In the embodiment of FIG. 1, the map data also includes data concerning points of interest. As will be described in more detail below, the position data processing module and the POI data processing module are operable to process position data obtained from the navigation or other devices in order to evaluate attributes of points of interest, and to perform further operations based upon the values of such attributes. It will be understood that although the server 8 in the embodiment of FIG. 1 is operable to gather position data from many different users, such position data may alternatively or additionally be provided by a third party for processing by the server 8.

Figure 2:
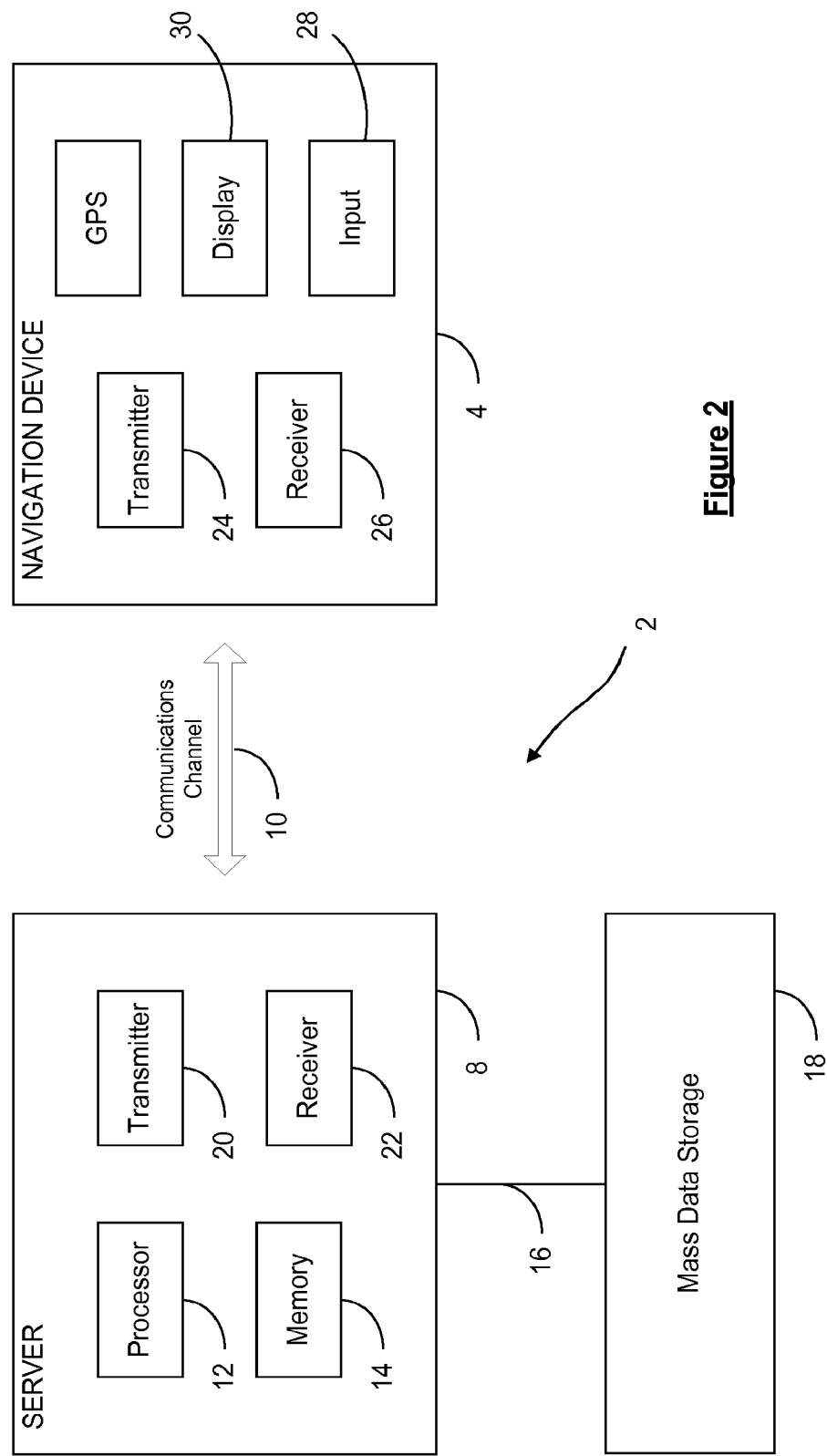
FIG. 2 is a schematic representation of a navigation system comprising an embodiment of the present invention.

The processing of position data, the evaluation of attributes of points of interest and the performance of further operations based upon the value of such attributes are described in more detail below. Firstly however, features of the server 8, one of the navigation devices 4 and communication between the navigation device 4 and the server 8 are described in more detail, by way of example, with reference to FIG. 2.

The navigation device 4 has or is coupled to a GPS receiver device 6. The navigation device 4 is capable of establishing a data session, if required, with network hardware of a "mobile" or telecommunications network via a mobile device (not shown), for example a mobile telephone, PDA, and/or any device with mobile telephone technology, in order to establish a digital connection, for example a digital connection via known Bluetooth technology. Thereafter, through its network service provider, the mobile device can establish a network connection (through the Internet for example) with a server 8. As such, a "mobile" network connection can be established between the navigation device 4 (which can be, and often times is, mobile as it travels alone and/or in a vehicle) and the server 8 to provide a "real-time" or at least very "up to date" gateway for information.

The establishing of the network connection between the mobile device (via a service provider) and another device such as the server 8, using the Internet for example, can be done in a known manner. In this respect, any number of appropriate data communications protocols can be employed, for example the TCP/IP layered protocol. Furthermore, the mobile device can utilize any number of communication standards such as CDMA2000, GSM, IEEE 802.11a/b/c/g/n, etc.

Hence, it can be seen that the internet connection may be utilised, which can be achieved via data connection, via a mobile phone or mobile phone technology within the navigation device 4 for example.

Although not shown, the navigation device 4 may, of course, include its own mobile telephone technology within the navigation device 4 itself (including an antenna for example). The mobile phone technology within the navigation device 4 can include internal components, and/or can include an insertable card (e.g. Subscriber Identity Module (SIM) card), complete with necessary mobile phone technology and/or an antenna for example. As such, mobile phone technology within the navigation device 4 can similarly establish a network connection between the navigation device 4 and the server 8, via the Internet for example, in a manner similar to that of any mobile device.

For telephone settings, a Bluetooth enabled navigation device may be used to work correctly with the ever changing spectrum of mobile phone models, manufacturers, etc., model/manufacturer specific settings may be stored on the navigation device 4 for example. The data stored for this information can be updated.

In FIG. 1, the navigation device 4 is depicted as being in communication with the server 8 via a generic communications channel 10 that can be implemented by any of a number of different arrangements. The communication channel 10 generically represents the propagating medium or path that connects the navigation device 4 and the server 8. The server 8 and the navigation device 4 can communicate when a connection via the communications channel 10 is established between the server 8 and the navigation device 4 (noting that such a connection can be a data connection via mobile device, a direct connection via personal computer via the internet, etc.).

The communication channel 10 is not limited to a particular communication technology. Additionally, the communication channel 10 is not limited to a single communication technology; that is, the communication channel 10 may include several communication links that use a variety of technology. For example, the communication channel 10 can be adapted to provide a path for electrical, optical, and/or electromagnetic communications, etc. As such, the communication channel 10 includes, but is not limited to, one or a combination of the following: electric circuits, electrical conductors such as wires and coaxial cables, fibre optic cables, converters, radio-frequency (RF) waves, the atmosphere, free space, etc. Furthermore, the communication channel 10 can include intermediate devices such as routers, repeaters, buffers, transmitters, and receivers, for example.

In one illustrative arrangement, the communication channel 10 includes telephone and computer networks. Furthermore, the communication channel 10 may be capable of accommodating wireless communication, for example, infrared communications, radio frequency communications, such as microwave frequency communications, etc. Additionally, the communication channel 10 can accommodate satellite communication.

The communication signals transmitted through the communication channel 10 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 10. These signals may be modulated, encrypted and/or compressed signals as may be desirable for the communication technology.

As mentioned above, the server 8 includes, in addition to other components which may not be illustrated, a processor 12 operatively connected to a memory 14 and further operatively connected, via a wired or wireless connection 16, to a mass data storage device 18. The mass storage device 18 contains a store of navigation data and map information, and can again be a separate device from the server 8 or can be incorporated into the server 8. The processor 12 is further operatively connected to transmitter 20 and receiver 22, to transmit and receive information to and from navigation device 4 via communications channel 10. The signals sent and received may include data, communication, and/or other propagated signals. The transmitter 20 and receiver 22 may be selected or designed according to the communications requirement and communication technology used in the communication design for the navigation system 2. Further, it should be noted that the functions of transmitter 20 and receiver 22 may be combined into a single transceiver.

The navigation device 4 can be arranged to communicate with the server 8 through communications channel 10, using transmitter 24 and receiver 26 to send and receive signals and/or data through the communications channel 10, noting that these devices can further be used to communicate with devices other than server 8. Further, the transmitter 24 and receiver 26 are selected or designed according to communication requirements and communication technology used in the communication design for the navigation device 4 and the functions of the transmitter 24 and receiver 26 may be combined into a single transceiver. Of course, the navigation device 4 may also comprise other hardware and/or functional parts.

Software stored in server memory 14 provides instructions for the processor 12 and allows the server 8 to provide services to the navigation device 4. One service provided by the server 8 involves processing requests from the navigation device 4 and transmitting navigation data from the mass data storage 18 to the navigation device 4. Another service that can be provided by the server 8 includes processing the navigation data using various algorithms for a desired application and sending the results of these calculations to the navigation device 4.

The server 8 may constitute a remote source of data accessible by the navigation device 4 via a wireless channel. The server 8 may include a network server located on a local area network (LAN), wide area network (WAN), virtual private network (VPN), etc.

The server 8 may include a personal computer such as a desktop or laptop computer, and the communication channel 10 may be a cable connected between the personal computer and the navigation device 4. Alternatively, a personal computer may be connected between the navigation device 4 and the server 8 to establish an internet connection between the server 8 and the navigation device 4.

The navigation device 4 may be provided with information from the server 8 via information downloads which may be periodically updated automatically or upon a user connecting the navigation device 4 to the server 8 and/or may be more dynamic upon a more constant or frequent connection being made between the server 8 and navigation device 40 via a wireless mobile connection device and TCP/IP connection for example. For many dynamic calculations, the processor 12 in the server 8 may be used to handle the bulk of processing needs, however, a processor (not shown in FIG. 1) of the navigation device 4 can also handle much processing and calculation, oftentimes independent of a connection to a server 8.

The navigation device 4 further comprises an input device 28 and a display device 30, for example, a display screen. Although reference is made here to the input device 28 in the singular, the skilled person should appreciate that the input device 28 represents any number of input devices, including a keyboard device, voice input device, touch panel and/or any other known input device utilised to input information. Likewise, the display device 30 can include any type of display screen such as a Liquid Crystal Display (LCD), for example.

In one arrangement, the input device 38 and the display device 30 are integrated so as to provide an integrated input and display device, including a touchpad or touchscreen input to enable both input of information (via direct input, menu selection, etc.) and display of information through the touch panel screen so that a user need only touch a portion of the display screen to select one of a plurality of display choices or to activate one of a plurality of virtual or "soft" buttons.

As mentioned above, the processor 12 of the server 8 is operable to process user position data to determine attribute values for POIs. The attribute values can be stored in the data storage 18 for subsequent access or processing. In one example, The processor 12 is operable to determine an attribute value for a POI in the vicinity of a user, or to read the attribute value from the data storage 18 if it has previously been determined, and to send the attribute value for the POI to the navigation device 4 for display to the user via the display device 30.

Examples of attributes for a POI referred to herein include the number of users visiting the POI, the speed of a user in a vicinity of the POI and the length of time spent by a user in a vicinity of the POI. Other attributes for a POI include a quality parameter calculated as a function of one or more such attributes. Yet further attributes of a POI include opening and closing times, and busy and quiet times.

Figure 3:
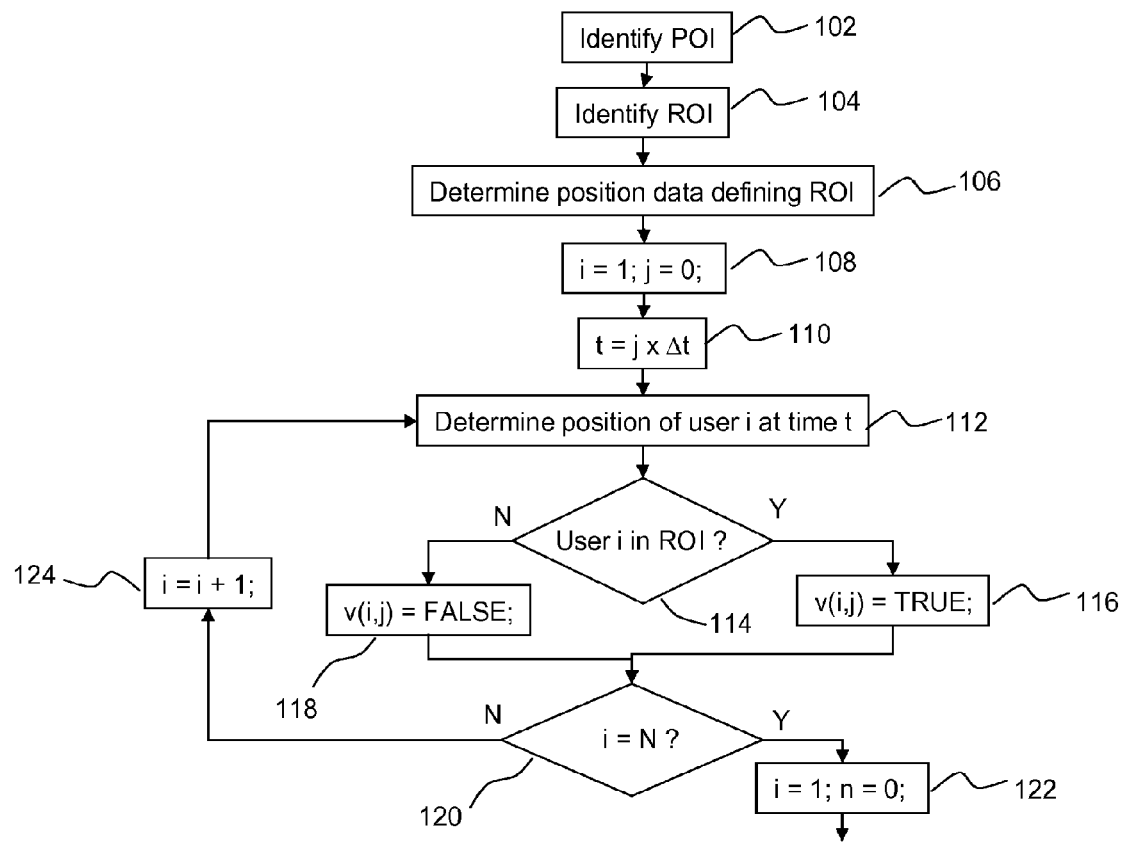
FIG. 3 is a flow chart illustrating an initialisation procedure constituting a first part of a method of evaluating an attribute associated with a point of interest over a time period T.

FIG. 3 illustrates an initialisation procedure of an embodiment of a method for determining the attribute value of a POI associated with a time period T, performed in this example by the position data processing module 11 and the POI data processing module 13 using position data and POI data stored in the data storage 18. As shown in FIG. 3, the method begins with identification of a POI at step 102 and continues with identification of an associated region (AR) associated with the POI at step 104. The method continues with determination of position data defining the AR at step 106. At step 108 of the method, a user index i is initialised to 1 and a time index j is initialised to zero. A time t is calculated at step 110 as the product of the time index j and a sampling interval ☐t.

Step 112 comprises determining the position of a user i at time t, for example by looking up position data for user i at time t stored in the data storage 18, or other database of position data. The position of the user i at time t is compared with the position data of the AR at step 114 to determine whether the user i is in the AR at time t. If the user is in the AR, then the value of a Boolean array element v(i,j) for user i at time t is set to TRUE at step 116, else the value of the Boolean array element v(i,j) is set to FALSE at step 118. If the user index i is equal to the total number of users N at step 120, the user index is re-initialised to 1 and the number of users n visiting the POI is initialised to zero at step 122, else the user index i is incremented by one at step 124 and steps 112 to 120 inclusive are repeated until the user index i is found to be equal to the total number of users N at step 120.

Figure 4:
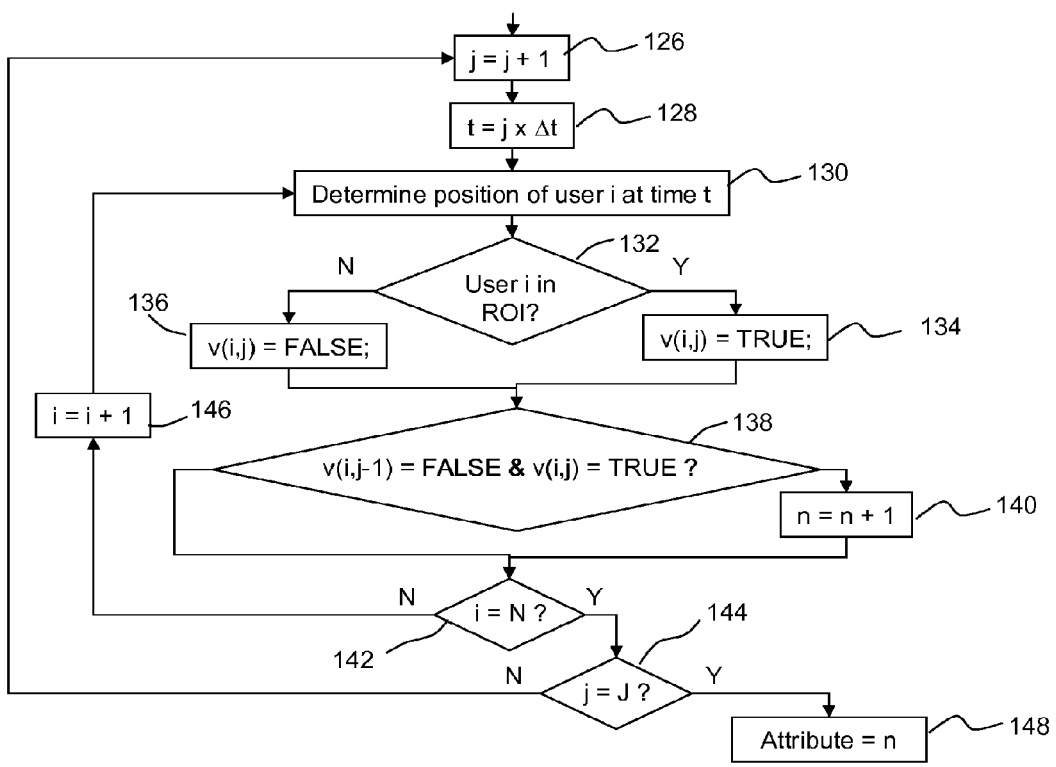
FIG. 4 is a flow chart illustrating a second part of the method of evaluating an attribute associated with a point of interest over a time period T of FIG. 3.

The method continues by incrementing the time index j by one at step 126 and the recalculation of time t at step 128 as the product of the time index j and the sampling interval ☐t as shown in FIG. 4. Step 130 comprises determining the position of user i at time t. The position of the user i at time t is compared with the position data of the AR at step 132 to determine whether the user i is in the AR at time t. If the user is in the AR, then the value of the Boolean array element v(i,j) for user i at time t is set to TRUE at step 134, else the value of the Boolean array element v(i,j) is set to FALSE at step 136. If the value of the previous Boolean array element v(i,j−1) is FALSE and the value of the present Boolean array element v(i,j) is TRUE at step 138, then user i has entered the AR between times t=(j−1)☐t and t=j☐t and the number of users n visiting the POI is incremented by one at step 140.

If the user index i is equal to the total number of users N at step 142, then a check is performed at step 144 to determine if j=J where J is the number of time intervals ☐t in time period T (i.e. T=J☐t), else the user index i is incremented by one at step 146 and steps 130 to 142 inclusive are repeated until the index i is found to be equal to the total number of users N at step 142 If j=J at step 144, then the attribute value is the value of n determined at step 148, else the time index i is incremented by one at step 126 and steps 128 to 144 inclusive are repeated until the time index j is found to be equal to the number J of time intervals ☐t in time period T at step 144.

Figure 5:
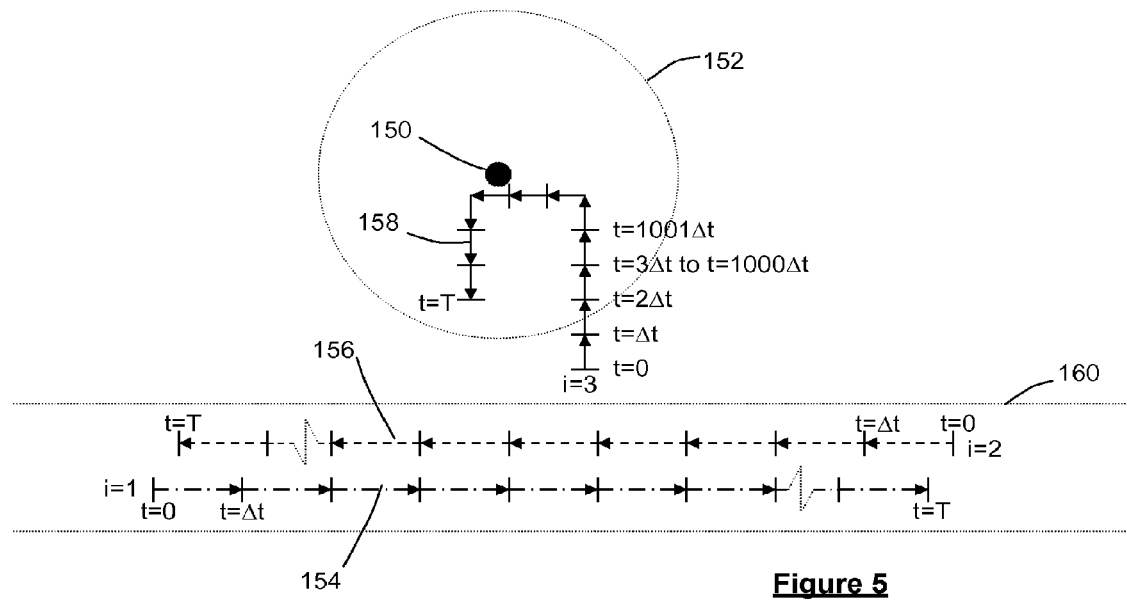
FIG. 5 is a schematic representation illustrating the use of the method illustrated in FIGS. 3 and 4 for an example of three users.

FIG. 5 illustrates the method of FIGS. 3 and 4 for a POI 150 having an associated circular AR 152 centred on the POI 150 for the example of three different user traces (i.e. N=3), each user trace representing the position of a user i as a function of time t between t=0 and t=T: trace 154 for user i=1 shown as a dashed-dotted line, trace 156 for user i=2 shown as a dashed line and trace 158 for user i=3 shown as a solid line. The radius of the circular AR 152 is selected so that the circumference of the AR 152 delimits the ground or property associated with the POI 150 and separates the ground or property associated with the POI 150 from the ground or property associated with one or more other POIs (not shown). The position data of the POI 150 is stored in the mass storage database 18. Similarly, the position data defining the AR 152 is stored in the mass storage database 18.

Trace 154 corresponds to the movement of a user i=1 along a road 160 whilst trace 156 corresponds to the movement of user i=2 along the same road 160 but in an opposite direction. Trace 158 corresponds to the movement of a user i=3 along a different road that may be an approach road to the POI 150 or which may be a further road that passes adjacent to or nearby the POI 150. Neither trace 154 of user i=1 nor trace 156 of user i=2 enter the AR 152 between t=0 to t=T. However, trace 158 of user i=3 enters the AR 152 between t=☐t and t=2☐t and applying the method of FIGS. 2 and 3 to the traces 154, 156 and 158 of FIG. 4 yields the number of users n entering the AR 152 between t=0 and t=T as one i.e. the number of users n visiting the POI 150 between t=0 and t=T is one.

It should be understood that, although the number of users N=3 for the example of FIG. 5, in general, N is much greater than three. Furthermore, although the movements of the users described for the example of FIG. 5 correspond to the movements of the users over a time period of the order of minutes or hours, in general, the movements of the users may be traced for periods of days, weeks, months or even years.

Figure 6:
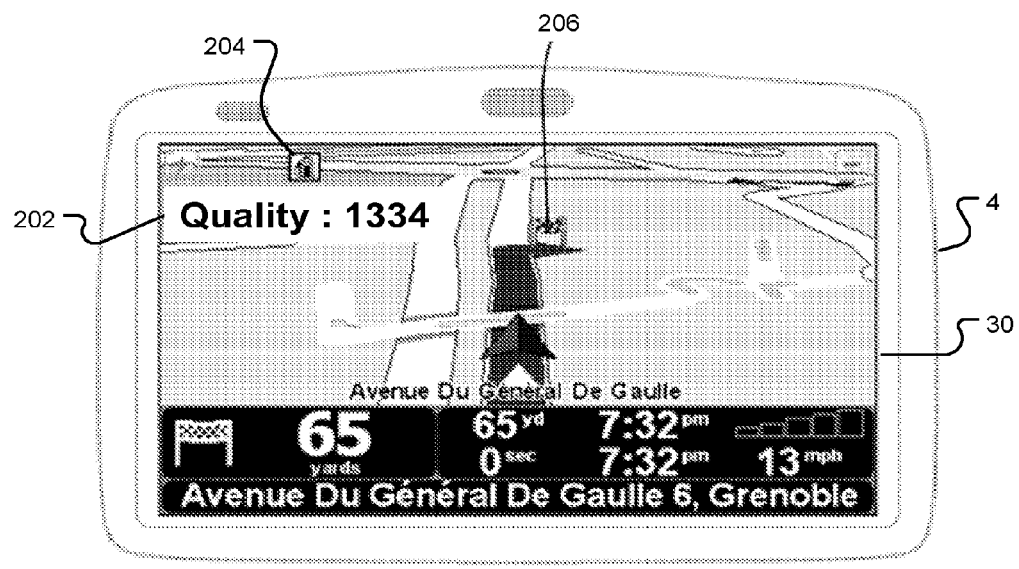
FIG. 6 shows a screen shot of a Portable Navigation Device displaying a quality attribute for a point of interest comprising a petrol or gas station as determined using the method of FIGS. 3 and 4.

The number of users visiting a POI in a time period is representative of the popularity of the POI during the time period. However, in general the number of users visiting a POI varies depending, in particular, on the time of day and the day of the week. Accordingly, to determine the popularity of the POI, the number of users visiting a POI is generally evaluated by the server processor 12 for a time period for one or more weeks. Accordingly, in one embodiment, the server processor 12 calculates a quality parameter for a POI as the number of users visiting the POI in a one week period. The quality parameter for the POI is subsequently transmitted to the navigation device 4 and may be displayed by the display device 30 in response to user input via input device 28. For example, as shown in FIG. 6, the quality parameter for the petrol station POI may be displayed at a position 202 adjacent to a petrol pump symbol 204 representing the position of the POI on the display device 30. As shown in FIG. 6, the POI may be in the same geographical area as a destination 206 of the user. Alternatively, the POI may itself be the destination of the user.

Figure 7:
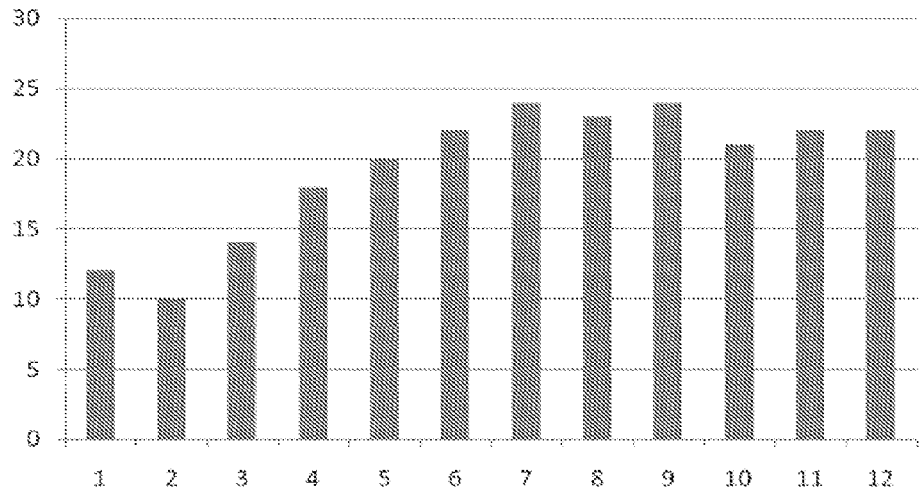
FIG. 7 is a bar chart illustrating the evolution of the number of users visiting a point of interest month-by-month over a one year period as determined using the method of FIGS. 3 and 4.

The server processor 12 may also calculate the evolution of the number of users visiting a POI over time. FIG. 7, for example, shows the number of users visiting a POI calculated by the server processor 12 for each month in a 12 month period. Although such information may not be particularly useful for an individual user, such information may be invaluable to an owner or operator of a POI. For example, such information can provide an indication of customer behaviour over time to the owner or operator of the POI. Such information can provide an indication of a change in the number of customers attracted to the POI over time as a result of a change in the goods and/or services offered at the POI, for example, in the price and/or quality of the goods and/or services offered at the POI. Such information can also provide an indication of a change in the number of customers attracted to other POIs over time thus allowing an owner or operator of a particular POI to monitor the popularity of other POIs offering the same goods and/or services in the same geographical region. Any changes in the number of returning customers attracted to a POI over time may also be calculated. Such information is generally accessible via a display (not shown) or other output devices and/or output ports (not shown) associated with the server 8.

Figure 8:
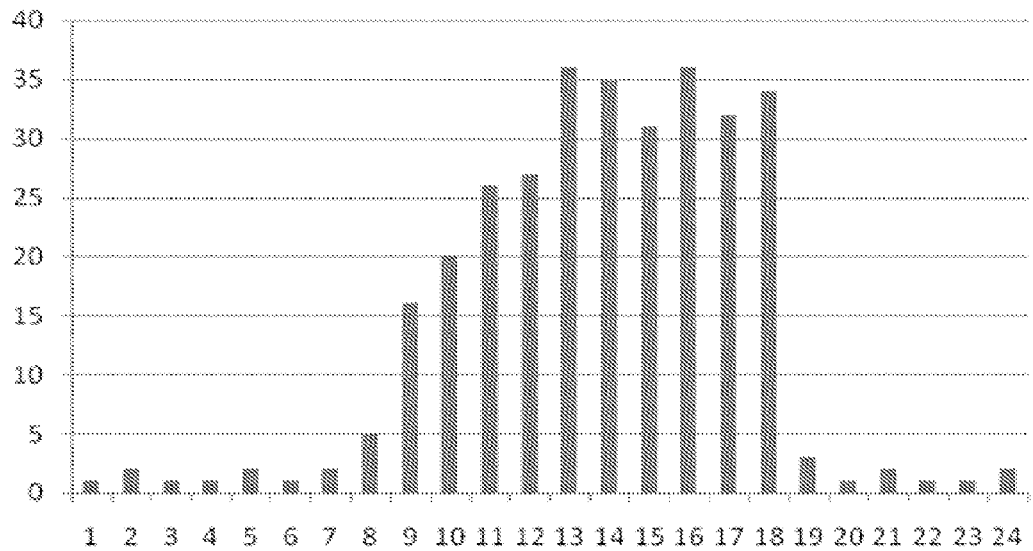
FIG. 8 is a bar chart illustrating the evolution of the number of users visiting a point of interest on the same day of the week over the course of several weeks on an hour-by-hour basis as determined using the method of FIGS. 3 and 4.

FIG. 8 shows the number of users visiting a POI calculated by the server processor 12 for each hour during a particular week day averaged over a period of several weeks. The server processor 12 subsequently extracts an opening time for the POI according to whether the number of users visiting the POI in an hour is less than or equal to four and the number of users visiting the POI in a consecutive hour is greater than four.

For the example shown in FIG. 8, the number of users visiting the POI in the $7^{th}$ hour between 06:00 and 07:00 is two whilst the number of users visiting the POI in the eighth hour between 07:00 and 08:00 is five indicating an opening time of 7:00 am for the day of the week in question.

The server processor 12 subsequently extracts a closing time for the POI according to the whether the number of users visiting the POI in an hour is greater than or equal to four and the number of users visiting the POI in a consecutive hour is less than four. For the example shown in FIG. 8, the number of users visiting the POI in the $18^{th}$ hour between 17:00 and 18:00 is 34 whilst the number of users visiting the POI in the $19^{th}$ hour between 18:00 and 19:00 is three indicating a closing time of 6:00 pm for the day of the week in question.

Figure 9:
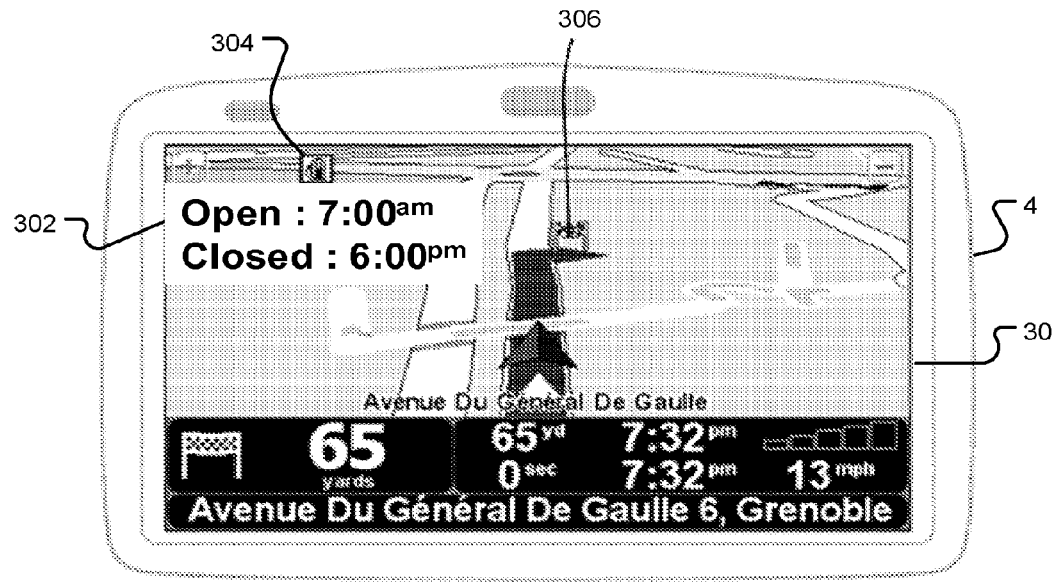
FIG. 9 shows a screen shot of a Portable Navigation Device displaying opening and closing times for a point of interest comprising a petrol or gas station as determined using the method of FIGS. 3 and 4.

Opening and closing times for the POI on the relevant day of the week can be subsequently transmitted to the navigation device 4 and may be displayed by the display device 30 in response to user input via input device 28. For example, as shown in FIG. 9, the opening and closing times for a petrol station POI may be displayed at a position 302 adjacent to a petrol pump symbol 304 representing the position of the POI on the display device 30. As shown in FIG. 9, the POI may be in the same geographical area as a destination 306 of the user. Alternatively, the POI may itself be the destination of the user.

Although displaying the number of users visiting a POI in a time period may provide a user with useful information relating to the popularity of the POI, to allow the user to make a choice between different POIs offering the same or similar good and/or services in the same geographical area further information may be required.

Figure 10:
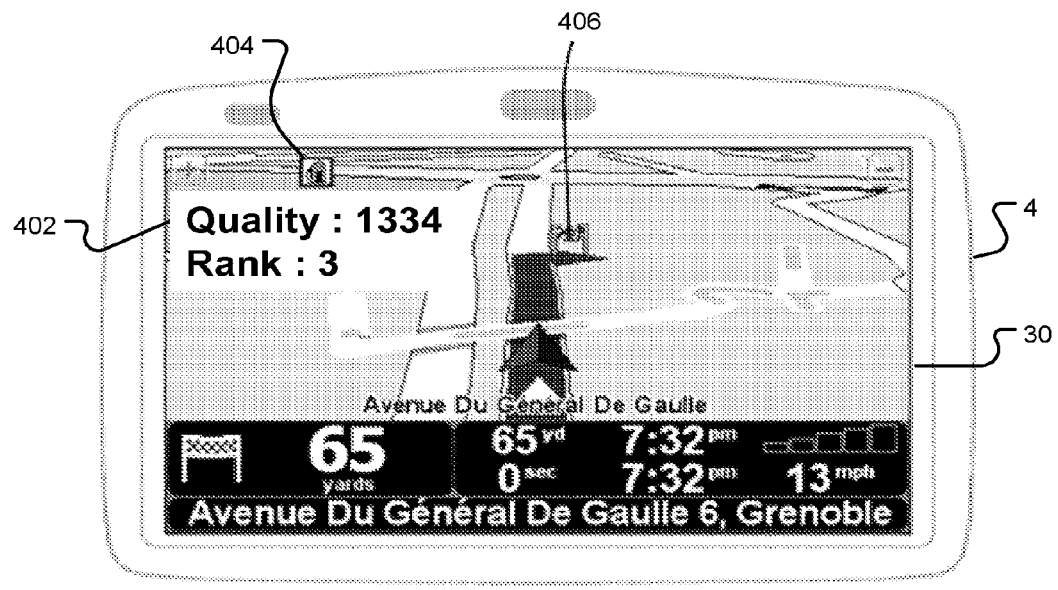
FIG. 10 shows a screen shot of a Portable Navigation Device displaying quality and rank attributes for a point of interest comprising a petrol or gas station as determined using the method of FIGS. 3 and 4.

The server processor 12 is operable to calculate a quality parameter for each POI offering the same or similar good and/or services in the same geographical area and ranks the POI according to quality parameter. The rank for the POI is subsequently transmitted to the navigation device 4 and may be displayed by the display device 30 in response to user input via input device 28. For example, as shown in FIG. 10, the quality and rank for a petrol station POI may be displayed by the display device 30 at a position 402 adjacent to a petrol pump symbol 404 representing the position of the POI on the display device 30. As shown in FIG. 10, the POI may be in the same geographical area as a destination 406 of the user. Alternatively, the POI may itself be the destination of the user.

It should be understood that the embodiments described herein are merely exemplary and that various modifications may be made without departing from the scope of the present invention. For example, an AR can be defined to have any suitable shape and size. The shape and size of an AR can be selected in dependence on the nature of the POI and/or any grounds or property associated with the POI and various alternative AR definitions are possible.

Figure 11A:
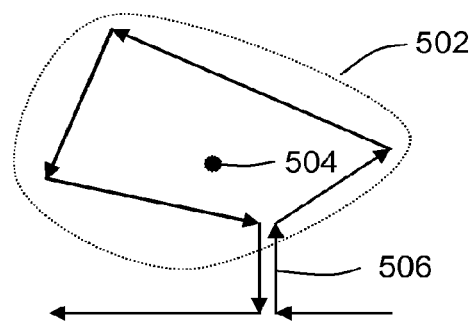
FIG. 11(a) is a schematic representation illustrating a path followed by a user visiting a point of interest having an associated region surrounding the point of interest.
Figure 11B:
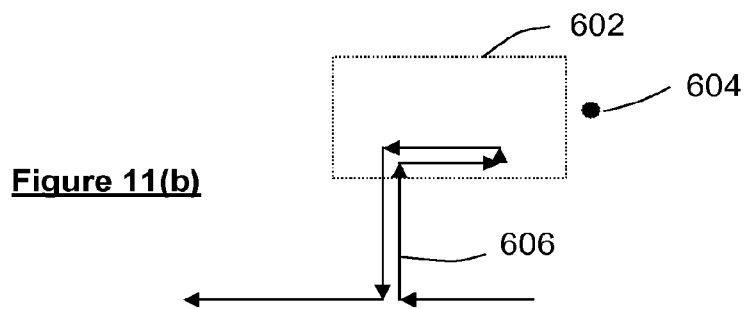
FIG. 11(b) is a schematic representation illustrating a path followed by a user visiting a point of interest having an associated region adjacent to the point of interest.
Figure 11C:
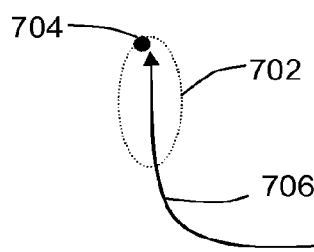
FIG. 11(c) is a schematic representation illustrating a path followed by a user visiting a point of interest having an associated region associated with an approach road of the point of interest.
Figure 11D:
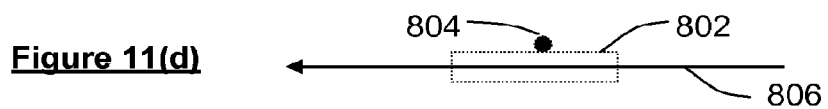
FIG. 11(d) is a schematic representation illustrating a path followed by a user visiting a point of interest having an associated region associated with a portion of a road passing adjacent to the point of interest.

FIG. 11(a), for example, illustrates a AR 502 surrounding a POI 504 and shows a trace 506 for a user visiting the POI 504. The POI 504 may, for example, be a park or the like and the AR 502 may be defined to coincide with a physical perimeter of the park such as a boundary fence or the like. FIG. 11(b) illustrates an AR 602 adjacent to a POI 604 and shows a trace 606 for a user visiting the POI 604. The POI 604 may, for example, be a retail outlet such as a petrol station or a supermarket and the AR 602 may be defined to coincide with a perimeter of a forecourt associated with the petrol station or a car park associated with the supermarket. FIG. 10(c) illustrates an AR 702 associated with a POI 704 and shows a trace 706 for a user visiting the POI 704. The POI 704 may, for example, be a historic monument or building and the AR 702 may be defined to coincide with at least a portion of an approach road or driveway of the POI 704. FIG. 10(d) illustrates an AR 802 associated with a POI 804 and shows a trace 806 for a user visiting the POI 804. The POI 804 may, for example, be a roadside restaurant or motel and the AR 802 may be defined to coincide with at least a portion of a road that passes the POI 804.

In the embodiments described, the number of users visiting a POI was determined according to the number of users entering a AR associated with the POI. However, depending on the nature of the POI and the definition of the AR and, in particular, the proximity of the POI to a road or thoroughfare, users may enter the AR without visiting the POI. Accordingly, the number of users visiting a POI may be defined as the number of users entering the AR and having an average speed in the AR less than a threshold speed. Alternatively, the number of users visiting a POI may be defined as the number of users entering the AR and spending a length of time in the AR greater than a threshold time period.

In addition, the average length of time spent visiting a POI by a plurality of users may also be indicative of the popularity of the POI or the level of interest of the users in the goods and/or services provided by the POI. Accordingly, the quality parameter for a POI may be a function of the number of users visiting a POI and/or the average length of time spent visiting a POI. The average length of time spent visiting a POI may, however, reflect the efficiency with which the goods and/or services are provided by the owner or operator of the POI rather than the popularity of the POI and, for such POIs, a quality parameter which is a function of the average length of time spent visiting a POI may not be appropriate.

Rather than calculating an opening and/or closing time for the POI according to whether the number of users visiting the POI in an hour is less than or equal to threshold number of users, the server processor 12 may calculate a busy time for the point of interest according to the hour during a particular day of the week for a plurality of weeks in which the number of users visiting the POI is highest. Similarly, the server processor 12 may calculate a quiet time for the point of interest according to the hour during a particular day of the week for a plurality of weeks in which the number of users visiting the POI is lowest. The calculated busy and/or quiet times may subsequently be transmitted to the navigation device 4 and displayed by the display device 30 in response to a user request.

Whilst embodiments described in the foregoing detailed description refer to GPS, it should be noted that devices described herein may utilise any kind of position sensing technology as an alternative to (or indeed in addition to) GPS. For example devices may utilise using other global navigation satellite systems such as the European Galileo system. Equally, such devices are not limited to using satellite based navigation systems but could readily function using ground based beacons or any other kind of system that enables the device to determine its geographic location.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

It will also be well understood by persons of ordinary skill in the art that whilst the described embodiments implement certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

It will be understood that the present invention has been described above purely by way of example, and modifications of detail can be made within the scope of the invention.

Each feature disclosed in the description, and (where appropriate) the claims and drawings may be provided independently or in any appropriate combination.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A method of determining a popularity level for one or points of interests (POIs), said method comprising:
   receiving, by a processor, position data from a plurality of navigation devices;
   determining, by the processor, a proportion of users entering a region associated with or adjacent to a first POI relative to a total number of users entering an area or zone comprising the first POI based on the received position data;
   determining, by the processor, a proportion of users entering a region associated with or adjacent to a second POI relative to a total number of users entering an area or zone comprising the second POI based on the received position data;
   comparing, by the processor, the proportion determined for the first POI to the proportion determined for the second POI;
   determining, by the processor, a popularity for the first POI and a popularity for the second POI based on the proportion comparison of the first POI and the second POI; and
   providing, by the processor, an indication of the popularity of at least the first POI or the second POI for display to one or more users.

2. The method according to claim 1, wherein the region associated with or adjacent to the POIs comprises at least one of: a car park, a road, an approach road and a driveway.

3. The method according to claim 1, wherein the area or zone comprising the first POI surrounds the first POI and the area or zone comprising the second POI surrounds the second POI.

4. The method of claim 1, wherein the area or zone comprising the first POI further comprises the second POI.

5. The method of claim 1 further comprising categorizing at least the first POI or second POI.

6. The method of claim 5 further comprising ranking the first POI or second POI based on POIs in the same category as the first POI or second POI.

7. The method of claim 6, wherein the ranking of the first POI or the second POI is relative to other POIs within a predefined geographical area.

8. The method of claim 1, wherein the popularity indication is provided to a user associated with the first POI or second POI to determine a popularity of goods or services associated with the first POI or second POI.

9. The method of claim 8, wherein the popularity indication is further used to analyse visitor behaviour for the first POI or second POI.

10. The method of claim 1, wherein the popularity indication is provided to users entering an area or zone comprising the first POI or the second POI.

11. A system for determining a popularity level for one or points of interests (POIs), the system comprising:
    a memory storage for position data; and
    a processing unit coupled to the memory storage, wherein the processing unit is operative to:
    receive position data from a plurality of navigation devices;
    determine a proportion of users entering a region associated with or adjacent to a first POI relative to a total number of users entering an area or zone comprising the first POI based on the received position data;
       determine a proportion of users entering a region associated with or adjacent to a second POI relative to a total number of users entering an area or zone comprising the second POI based on the received position data;
       compare the proportion determined for the first POI to the proportion determined for the second POI;
       determine a popularity for the first POI and a popularity for the second POI based on the proportion comparison of the first POI and the second POI; and
    provide an indication of the popularity of at least the first POI or the second POI for display to one or more users.

12. The system according to claim 11, wherein the region associated with or adjacent to the POI comprises at least one of: a car park, a road, an approach road and a driveway.

13. The system of claim 11, wherein the area or zone comprising the first POI further comprises the second POI.

14. The system of claim 11 further comprising categorizing at least the first POI or second POI.

15. The system of claim 14 further comprising ranking the first POI or second POI based on POIs in the same category as the first POI or second POI.

16. The system of claim 15, wherein the ranking of the first POI or the second POI is relative to other POIs within a predefined geographical area.

17. The system of claim 11, wherein the popularity indication is provided to a user associated with the first POI or second POI to determine a popularity of goods or services associated with the first POI or second POI.

18. The system of claim 11, wherein the popularity indication is provided to users entering an area or zone comprising the first POI or the second POI.

19. A non-transitory computer-readable medium which stores a set of instructions which when executed performs a method for determining a popularity level for one or points of interests (POIs), the method executed by the set of instructions comprising:
    receiving position data from a plurality of navigation devices;
    determining a proportion of users entering a region associated with or adjacent to a first POI relative to a total number of users entering an area or zone comprising the first POI based on the received position data;
    determining a proportion of users entering a region associated with or adjacent to a second POI relative to a total number of users entering an area or zone comprising the second POI based on the received position data;
    comparing the proportion determined for the first POI to the proportion determined for the second POI;
    determining a popularity for the first POI and a popularity for the second POI based on the proportion comparison of the first POI and the second POI; and providing an indication of the popularity of at least the first POI or the second POI for display to one or more users.

20. The method of claim 19 further comprising categorizing at least the first POI or second POI and ranking the first POI or second POI based on POIs in the same category as the first POI or second POI.

\* \* \* \* \*